Nov. 12, 1968     R. S. ROOT ET AL     3,410,382
HIGHBURST CAPACITY CLUTCH WITH A
TWO-PIECE PRESSURE PLATE
Filed July 26, 1966
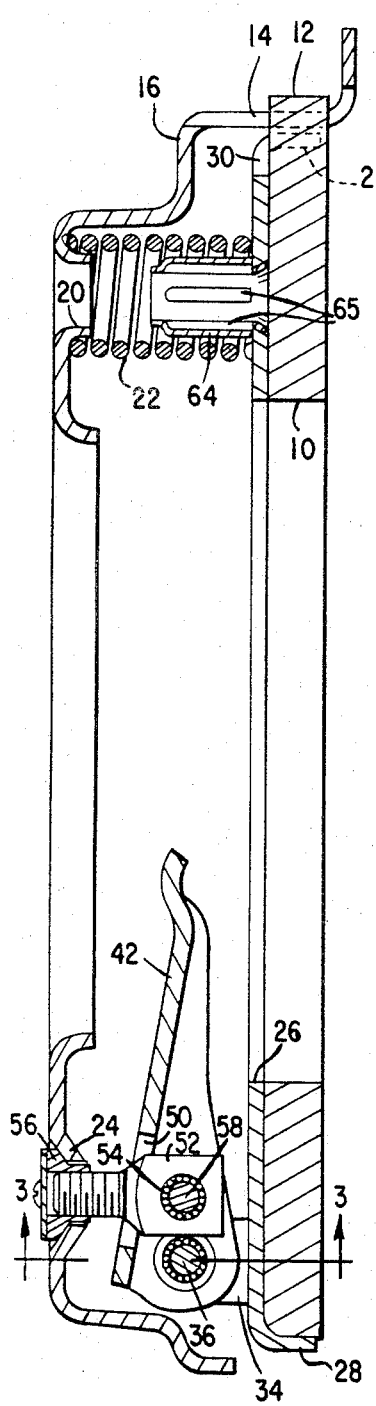
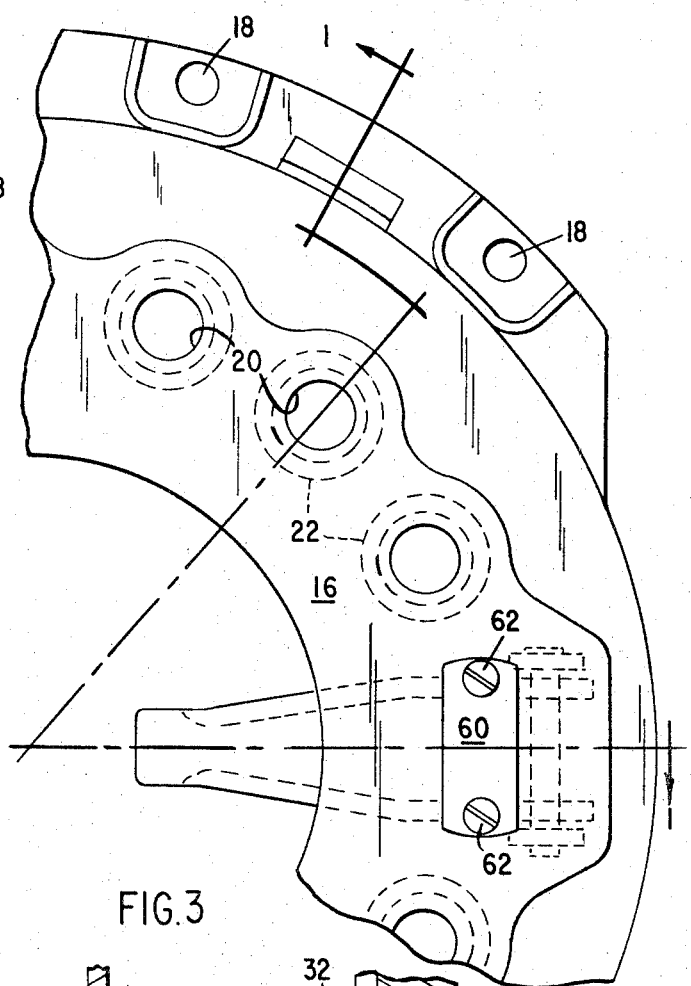
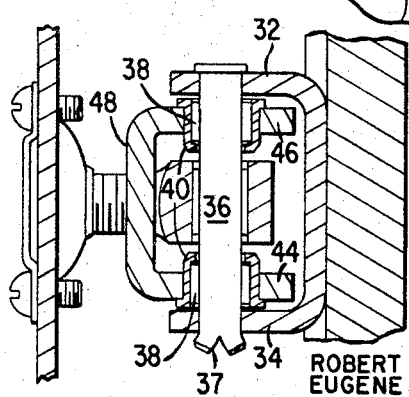
INVENTORS.
ROBERT S. ROOT.
EUGENE E. YOUNG.
BY
*John R. Varney.*
ATTORNEY.

3,410,382
HIGHBURST CAPACITY CLUTCH WITH A TWO-PIECE PRESSURE PLATE

Robert S. Root and Eugene E. Young, Syracuse, N.Y., assignors to Life-Rollway Corporation, Syracuse, N.Y., a corporation of New York
Filed July 26, 1966, Ser. No. 572,870
1 Claim. (Cl. 192—107)

ABSTRACT OF THE DISCLOSURE

A disc type clutch having an increased centrifugal burst capacity, including a two-piece pressure plate having a cast portion and a stamped portion, said cast portion having radially and circumferentially extending driving lugs, and said stamped portion affixed to outer periphery of the cast portion by a flange which has apertures through which the driving lugs of the cast portion pass, and the stamped portion having means to affix clutch levers and compression springs thereto.

---

This invention relates to and has as an object a new and improved disc type clutch having an increased centrifugal burst capacity.

Heretofore clutches of the disc variety have been manufactured with a pressure plate made of cast iron. The pressure plate is formed in the casting with protuberances such as drive lugs to form a driving connection between the clutch cover and the pressure plate and with bosses to receive the clutch operating spring. A difficulty arises with such clutches when used in high speed applications in that at very high speeds the centrifugal force created by a large mass of the cast pressure plate rotating at high speed causes the pressure plate to burst as a result of the centrifugal force.

Accordingly, it is a more specific object of this invention to provide a disc clutch with a new and improved pressure plate assembly whereby the clutch has an increased centrifugal burst capacity.

The invention consists in the novel features and constructions and the method hereinafter set forth and claimed.

In describing the invention, reference is had to the accompanying drawings in which like characters designate corresponding parts in all the views.

In the drawings—

FIGURE 1 is a cross-sectional elevational view of a portion of a preferred embodiment of the invention with parts omitted, taken on line 1–1 on FIGURE 2.

FIGURE 2 is a fragmentary plan view of a portion of the clutch shown in FIGURE 1.

FIGURE 3 is a fragmentary cross-sectional view taken on line 3–3 of FIGURE 1.

In FIGURE 1 a portion of a disc type clutch is shown, and such a clutch is conventionally comprised of a driving member, and the motor fly wheel to which is suitably affixed the cover of the clutch assembly. Contained within the clutch assembly is a cast iron pressure plate which is normally urged into driving engagement by a plurality of compression springs carried between the cover and the pressure plate, the pressure plate engaging in a driving fashion, one or more friction discs which are splined to the shaft of the driven member, normally an output shaft. A plurality of clutch release levers are carried between the cover member and the pressure plate of the clutch assembly and are positioned to be operated by a throw-out bearing, normally journalled on the output shaft.

As previously set forth, the pressure plate is normally formed with driving lugs which extend through apertures formed in the cover member to form a driving connection from the fly wheel to the pressure plate through the cover member and in addition, the pressure plate is formed with upstanding bosses to receive and mount the compression springs. The pressure plate is also formed with lugs to provide a mounting arrangement for the clutch release levers. The forming of the pressure plate member with the bosses and lugs results in a greatly increased mass for the pressure plate all of which tends to cause the pressure plate to burst at relatively high speeds due to centrifugal force, this for the reason that centrifugal force is a function of the mass of the pressure plate.

The novel portion of this invention is the pressure plate assembly, which as best seen in FIGURE 1 comprises a relatively thin cast iron piece 10 formed with a plurality of driving lugs 12 which extend through apertures 14 formed in the cover member 16. The cover member 16, as best seen in FIGURE 2, is apertured at several places about its periphery as at 18 to permit the cover plate to be affixed to the driving member (not shown) usually a fly wheel.

The cover member is also formed with a plurality of inwardly extending apertures 20 which form bosses on the inner surface of the cover member to receive the compression springs 22. Finally, the cover mamber 16 is formed with depressed apertures 24 in which the clutch release lever mechanism is mounted as will be hereinafter described.

The novel portion of this invention comprises a plate member 26 which may be mass produced as by stamping or any other suitable operation and the plate 26 is formed around its outer periphery with a downwardly turned flange 28 to engage and grip the cast member 10. The plate 26 is apertured at spaced positions about its circumference as at 30 to permit the drive lugs 12 formed in the cast member to extend therethrough.

As best seen in FIGURES 1 and 3, the plate member 26 is formed with a pair of upstanding stamped ears 32 and 34 to receive a pin 36 therethrough. The pin 36 is journalled by a pair of needle bearings 38 carried in the cup-shaped members 40. The clutch release lever 42 is channel-shaped in cross-section, as best seen in FIGURE 3 and receives the cup member 40 in the legs 44 and 46 of the throw-out lever. The pin 36 is upset as at 37 to prevent rotation of the pin 36 in the legs 32 and 34.

The bight portion 48 of the throw-out lever is apertured as at 50 through which is received an eye bolt 52 and is mounted on the pin 58 by a needle bearing 54 to permit relative rotation between the eye bolt and the throw-out lever.

The outer end of the eye bolt is threadedly connected to a nut 56 which is received in the depressed aperture 24.

In operation, the clutch which is normally urged into driving engagement by the compression springs 22 is released by moving the throw-out levers 42 to the right, as viewed in FIGURE 1, pivoting the lever about the pin 36 and through the pivotal connection between the eye bolt 52 and the lever 42 as at 58 moving the pressure plate to the left as viewed in FIGURE 1 to release the clutch.

As best seen in FIGURE 2, the nut 56 which mounts the eye bolt 52 in the depressed aperture 24 is covered by a plate 60 affixed to the cover 16 by a pair of screws 62.

As will be obvious, the overall mass of the pressure plate assembly is reduced considerably over that of conventional clutches by making the plate member 10 of cast construction and by providing the assembly with the stamped plate 26 out of which are formed the ears 32 and 34 as previously described to mount the clutch release mechanism. Further, the plate 26 is apertured at a plurality of circumferentially spaced locations and hollow tubular members or pins 64 having axial ribs 65 formed therein are pressed or otherwise suitably mounted in the plate 26 in said apertures to form bosses upon which the inner end of the compression springs 22 are received.

The elimination of the cast bosses and lugs and substitution in applicants' novel construction of a stamped plate carrying the bosses and lever mounting mechanism considerably reduces the mass of the pressure plate assembly and results in a pressure plate assembly having a greatly increased burst capacity which is critical at the relatively high rotational speeds of the clutch.

What we claim is:

1. A cover plate assembly having increased centrifugal burst capacity for a disc type friction clutch comprising a two-piece pressure plate, said two piece pressure plate comprising a cast portion having a friction disc engaging surface and provided with a plurality of radially extending circumferentially spaced cover plate driving lugs, a stamped plate engaging the opposite surface of said cast plate, said stamped plate being formed with a plurality of clutch release levers receiving means formed in said stamped plate and clutch spring receiving bosses affixed to said stamped plate, said stamped plate being formed with a flange which is formed to envelope substantially the entire periphery of said cast portion, said flange being formed with apertures to permit the passage therethrough of said radially extending circumferentially spaced driving lugs.

References Cited
UNITED STATES PATENTS

| | | | |
|---|---|---|---|
| 1,756,428 | 4/1930 | Jones | 192—69 XR |
| 1,834,456 | 12/1931 | Jones | 192—68 |

BENJAMIN W. WYCHE III, *Primary Examiner.*

L. J. PAYNE, *Assistant Examiner.*